US008407763B2

(12) United States Patent
Weller et al.

(10) Patent No.: US 8,407,763 B2
(45) Date of Patent: Mar. 26, 2013

(54) SECURE NETWORK INTERFACE DEVICE

(75) Inventors: Michael K. Weller, Stroudsburg, PA (US); Jeffrey B. Canter, West Orange, NJ (US)

(73) Assignee: BAE Systems Information and Electronic Systems Integration Inc., Wayne, NJ (US)

( * ) Notice: Subject to any disclaimer, the term of this patent is extended or adjusted under 35 U.S.C. 154(b) by 915 days.

(21) Appl. No.: 12/455,229

(22) Filed: May 29, 2009

(65) Prior Publication Data
US 2009/0254985 A1 Oct. 8, 2009

Related U.S. Application Data

(63) Continuation-in-part of application No. 11/414,105, filed on Apr. 28, 2006, now Pat. No. 7,676,673.

(51) Int. Cl.
*H04L 29/06* (2006.01)
(52) U.S. Cl. ............................................ 726/3; 713/164
(58) Field of Classification Search ....... 726/3; 713/164
See application file for complete search history.

(56) References Cited

U.S. PATENT DOCUMENTS

| 5,802,178 | A | 9/1998 | Holden et al. |
| 5,828,832 | A | 10/1998 | Holden et al. |
| 5,832,228 | A | 11/1998 | Holden et al. |
| 5,864,683 | A | 1/1999 | Boebert et al. |
| 5,872,847 | A | 2/1999 | Boyle et al. |
| 6,067,620 | A | 5/2000 | Holden et al. |
| 6,272,538 | B1 | 8/2001 | Holden et al. |
| 6,760,768 | B2 | 7/2004 | Holden et al. |
| 7,559,080 | B2 | 7/2009 | Bhargavan et al. |
| 2003/0005331 | A1* | 1/2003 | Williams ...................... 713/201 |
| 2004/0225883 | A1 | 11/2004 | Weller et al. |
| 2007/0204151 | A1 | 8/2007 | Schnackenberg et al. |
| 2007/0255942 | A1 | 11/2007 | Weller et al. |
| 2008/0098143 | A1 | 4/2008 | Canter et al. |

OTHER PUBLICATIONS

W. S. Harrison et al., The MILS Architecture for a Secure Global Information Grid, The Journal of Defense Software Engineering (Oct. 2005), at pp. 20-24.

* cited by examiner

*Primary Examiner* — Gilberto Barron, Jr.
*Assistant Examiner* — Virginia T Ho
(74) *Attorney, Agent, or Firm* — Leo Zucker

(57) ABSTRACT

An interface device for a protected workstation or host has a network interface for connection to a multi-level secure network, a first address corresponding to a guard control port, and a second address corresponding to a guard data port. A transport guard in the device has a control component coupled to the guard control port for processing configuration data sent to the first address and producing a desired security configuration, a guard component coupled to the output of the control component and to the guard data port of the network interface, and a host interface coupled to the guard component for exchanging data with the protected host. Only when permitted by the desired security configuration, the guard component passes network data addressed to the second address of the network interface to the host interface, and passes outbound data from the host interface to the network through the guard data port.

20 Claims, 13 Drawing Sheets

FIG. 8

| SOURCE | DESTINATION | CLASSIFICATION | COMP 1 | COMP 2 | COMP 3 | INTEGRITY LEVEL |
|---|---|---|---|---|---|---|
| 92 | 94 | 96 | 98 | 100 | 102 | 104 |

| SECURITY ADDRESS | CLASS LOW | CLASS HIGH | COMP 1 | COMP 2 | COMP 3 | INTEGRITY | RECEIVE | TRANSMIT |
|---|---|---|---|---|---|---|---|---|
| SELF ADDRESS | | | | | | | | |
| DESTINATION 1 | | | | | | | | |
| DESTINATION 2 | | | | | | | | |
| DESTINATION N | | | | | | | | |

(120)
122 — SELF ADDRESS
124 — DESTINATION 1

SECURE NETWORK INTERFACE DEVICE

CROSS-REFERENCE TO RELATED APPLICATION

This application is a continuation-in-part of U.S. patent application Ser. No. 11/414,105 filed Apr. 28, 2006 now U.S. Pat. No. 7,676,673, entitled "Multi-Level Secure (MLS) Information Network", and assigned to the assignee of the present application and invention.

BACKGROUND OF THE INVENTION

1. Field of the Invention

The present application relates to network interface card systems.

2. Discussion of the Known Art

Information networks for use by the government and the military typically carry sensitive information that must be confined among individuals who have proper security clearances and a need to know. Multi-level security (MLS) concerns the ability of a network or computer system to handle messages that are classified as, for example, top secret (TS), secret (S) or confidential (C), as well as unclassified (U) messages. A MLS network typically allows higher-cleared individuals to access less-sensitive information.

U.S. Patent Application Publication No. 2004/0225883 (Nov. 11, 2004) concerns a method of providing multiple single levels of security (MSLS) in a communication system. The publication discloses an arrangement for enforcing system access policies by way of controlling hardware. Currently, solutions for providing embedded security in communication networks by way of software (as opposed to hardware) allow for greater flexibility.

A network architecture known as Multiple Independent Levels of Security (MILS) has been created to facilitate the development of MLS networks that can be certified as meeting the highest current standards, namely, Evaluation Assurance Levels (EALs) 5-7. See W. S. Harrison, et al., "The MILS Architecture for a Secure Global Information Grid", Journal of Defense Software Engineering (October 2005) at pages 20-24, which is incorporated by reference. MILS architecture partitions security enforcement into three layers, viz., the kernel, middleware, and application. As used herein, middleware refers to software that provides interoperability between an operating system and an application on a network. Examples include the known common object reference broker architecture (CORBA), and file systems.

The MILS architecture provides a structured approach to data separation and information flow control. The architecture facilitates proof in correctness of design of security mechanisms at various levels, by partitioning security enforcement into the three mentioned layers. See W. M. Vanfleet, et al., "Deeply Embedded High Assurance Multiple Independent Levels of Security, Real Time OS and Middleware Architecture" (slide presentation; Sep. 9, 2002).

The basic component of MILS architecture is the separation kernel (SK) which serves to separate processes or applications on a processor, and their resources, into isolated spaces sometimes known as partitions or process spaces. The separation kernel enforces data isolation and information flow control on each node. As used herein, "node" refers to a single hardware processor. The SK uses the processor's memory management unit to provide the process separation. The SK also uses inter-process communication (IPC) mechanisms such as shared memory or messaging, to provide information flow control on any given node (but not between partitions on separate processors). On a single processor system, little or no middleware is required to provide security enforcement.

For a network with more than one processor node, more complex middleware is required to enforce a data isolation and information flow control policy for the network. One particular approach to the multi-node middleware problem was disclosed by Bill Beckwith, "MILS Middleware: Status Update", Objective Interface Systems, Inc., Open Group Meeting, Security for Real-Time (slide presentation) (January 2004), discussing requirements for a partitioned communication system (PCS) designed for EAL 7 certification. The PCS approach relies on the kernel to enforce a network's information flow policies by way of a MILS message routing (MMR) component. The main function of the MMR is to open a communication path between applications in different partitions, but only if such communication is permitted by the flow policies of the network. The PCS approach is aimed at controlling network message routing at the CORBA level only. A PCS also requires encryption services to provide middleware protection between processors, and the kernel is relied upon to provide the middleware access control functionality.

Network security information flow control policies may include any of the following; viz., discretionary access control (DAC), mandatory access control (MAC), and integrity access control. Network security models typically use the terms "subjects" and "objects". Subjects are defined as active agents in a computer system, for example, live users, processes, and other computers. Objects refer to containers of data which can be acted upon by the subjects. Examples of objects include databases, file systems, and memory locations.

DAC defines certain access control policies for objects (e.g., files or databases), which policies may be set at the discretion of the object owner. The controls are discretionary in that the owner may permit access to the object directly or indirectly by other specified subjects. These access permissions are generally applied to users, but may be extended to apply to any subject in the network or system.

By contrast, MAC provides label-based access control according to hierarchical and non-hierarchical characteristics of both the subject and the object. If the label of a given subject dominates the object (e.g., is of a higher classification), then information originating from the object may flow to the subject. This is referred to as the Bell and La Padula security model, which permits "read down" and "write up" requests, while blocking requests to "read up" and "write down". The model requires that (1) a subject at a given security level may only read data from objects at the same or a lower security level, and (2) a subject at a given security level may only write data to objects having the same or a higher security level.

Integrity concerns a level of confidence or trust that may be placed in a subject or an object (e.g., an application) on the network. For example, the higher the level of integrity for a given application, the more confidence a subject may have that the application will execute properly. Likewise, data having a higher integrity level is known to be more accurate (i.e., reliable) than data of a lower integrity level. Network integrity may be defined, for example, by way of the so-called BIBA integrity model which permits information to flow from a higher integrity process to a lower integrity process, and, like MAC, may also be label-based.

SUMMARY OF THE INVENTION

According to the invention, a secure network interface device has a network interface configured to connect with a network on which data is exchanged among a number of hosts, wherein the network interface has a first network address corresponding to a guard control port of the interface, and a second network address corresponding to a guard data port. The device also includes a transport guard having (i) a control component coupled to the guard control port of the network interface for processing configuration data sent to the first network address and for producing a corresponding security configuration output, (ii) a guard component coupled to the output of the control component and to the guard data port of the network interface, and (iii) a host interface coupled to the guard component for exchanging data with a protected host. The guard component operates to pass data addressed to the second network address from the guard data port of the network interface to the host interface of the transport guard, and to pass outbound data at the host interface to the guard data port of the network interface according to the security configuration output from the control component of the transport guard.

According to another aspect of the invention, a multi-level secure network has a number of workstations for exchanging data with one another in accordance with a defined network security policy. A network interface device is associated with and protects each workstation. Each device includes (a) a network interface for connecting with the network, wherein the interface has a first network address corresponding to a guard control port and a second network address corresponding to a guard data port, and (b) a transport guard having (i) a control component coupled to the guard control port for processing configuration data addressed to the first network address and for outputting a corresponding security configuration, (ii) a guard component coupled to the output of the control component and to the guard data port of the network interface, and (iii) a host interface coupled to the guard component and configured to exchange data with the protected workstation. The guard component operates to pass inbound data addressed to the second network address from the guard data port of the network interface to the host interface of the transport guard, and to pass outbound data at the host interface to the guard data port of the network interface, in accordance with the security configuration output from the control component of the transport guard.

For a better understanding of the invention, reference is made to the following description taken in conjunction with the accompanying drawing and the appended claims.

BRIEF DESCRIPTION OF THE DRAWING

In the drawing:

FIG. 8 shows a security header for data packets to be managed by the transport guard;

FIG. 9 shows an access control table the transport guard;

DETAILED DESCRIPTION OF THE INVENTION

Figure 1:
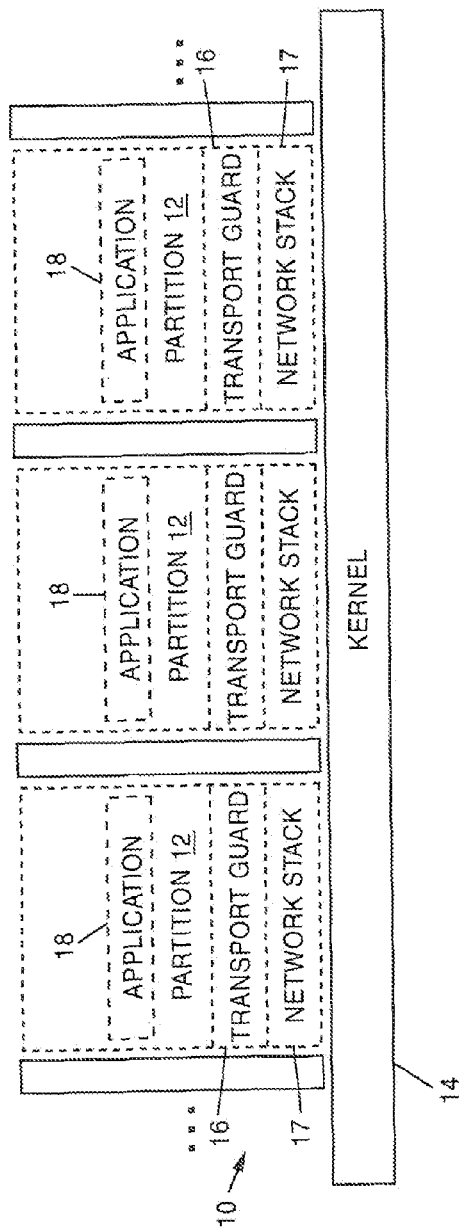
FIG. 1 is a block diagram showing a number of transport guards placed logically inside corresponding memory partitions of a secure network, according to the invention.
Figure 2:
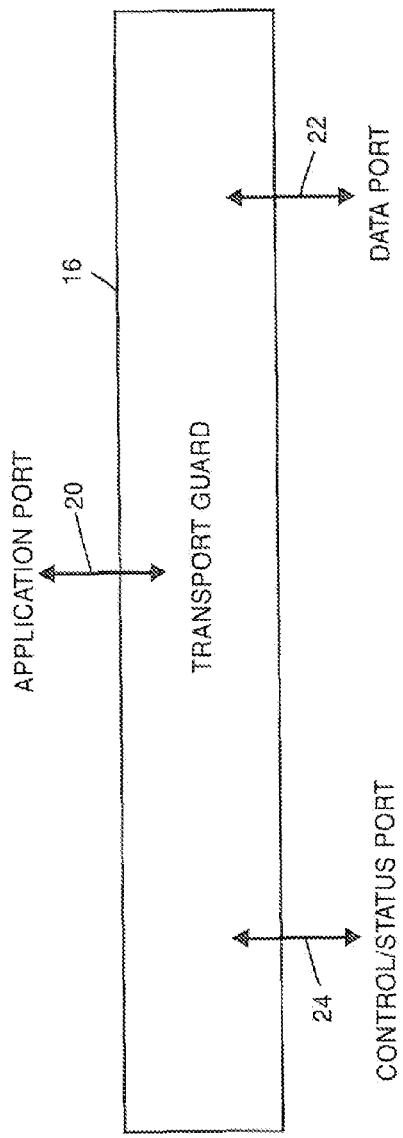
FIG. 2 is a block diagram showing ports of a transport guard in FIG. 1.

FIG. 1 shows a portion of a multi-level secure network 10, including a number of separate memory partitions 12 that are established by a separation kernel 14 of the network's operating system. A transport guard 16 according to the invention is created logically between a networking stack 17 and an application 18 assigned to operate on its own processor within a corresponding partition 12, under protection of the guard 16. As seen in FIG. 2, each transport guard 16 receives requests from the assigned application 18 via an application port 20 to send outgoing data destined to, e.g., another application, a user, or some other object on the network. If the guard 16 determines that the data conforms to the network security policy, as explained below, the outgoing data is forwarded to the kernel 14 through a data port 22 and into the networking stack 17 using, e.g., a kernel IPC mechanism.

Each transport guard 16 also receives incoming data at the port 22 from the networking stack, which data is destined to the protected application 18. If the data conforms to the network security policy, the guard 16 sends the incoming data to the application through the application port 20. Moreover, each guard 16 receives configuration data from a network security manager through a control/status port 24. Auditable events such as, e.g., the presence of non-conforming data at the application port 20 or the data port 22, are reported by the guard 16 to the security manager through the control/status port 24. The guards 16 may be implemented in software code, running in their own process space inside their associated partitions 12.

Each transport guard 16 provides mandatory and discretionary access control, and integrity access control over all information and other data flowing into and out of the networking stack 17 with respect to the guard's protected application 18. The guards 16 allow only authorized traffic to enter and exit each partition 12 by monitoring and selectively labeling both incoming and outgoing data or traffic. Further, the guards may be implemented at any layer of the conventional OSI network model, for example, the CORBA level immediately under the ORB. Each transport guard 16 may be viewed as implementing the goals of a reference monitor in that the guard's functions are non-bypassable, evaluatable (to determine usefulness and/or effectiveness of a given rule), always invoked, and tamper-proof.

Figure 3:
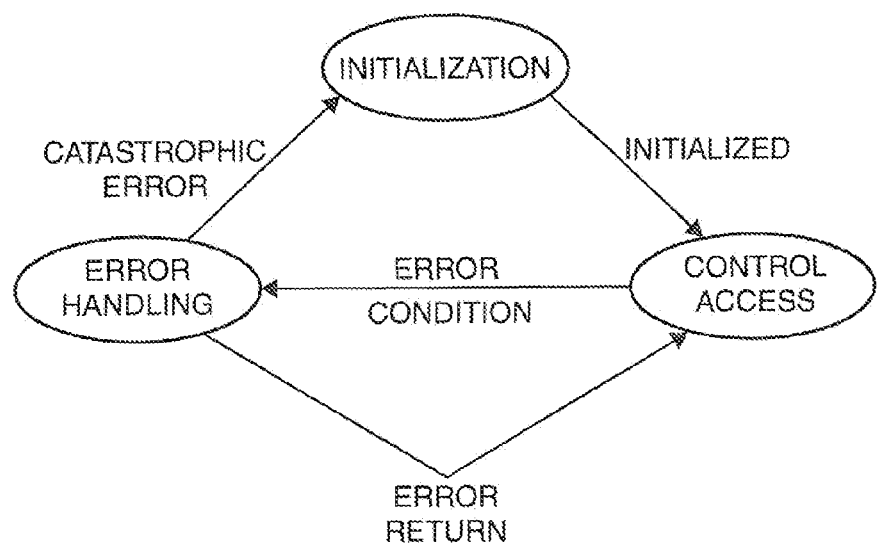
FIG. 3 is a high-level state diagram for the transport guard.
Figure 4:
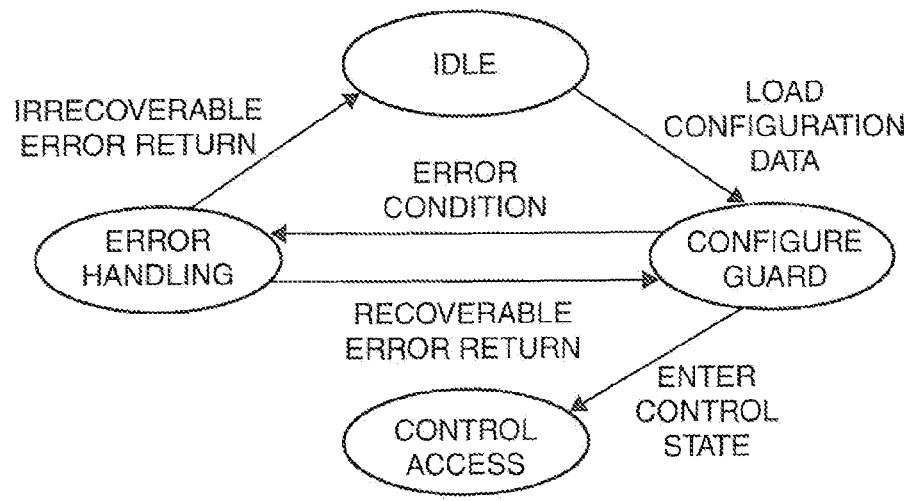
FIG. 4 is a state diagram showing initialization of the transport guard.

FIG. 3 shows three high-level or major states of each of the transport guards 16, namely; initialization, control access, and error handling. The initialization state is illustrated in FIG. 4 wherein each guard is activated and idles with its application port 20 and data port 22 inhibited. Each guard is then configured by the network security manager via the guard's control/status port 24. Once configured, the guards 16 enter a control access state (FIG. 5) in which they operate to monitor and control the flow of data to and from their protected applications 18.

Figure 5:
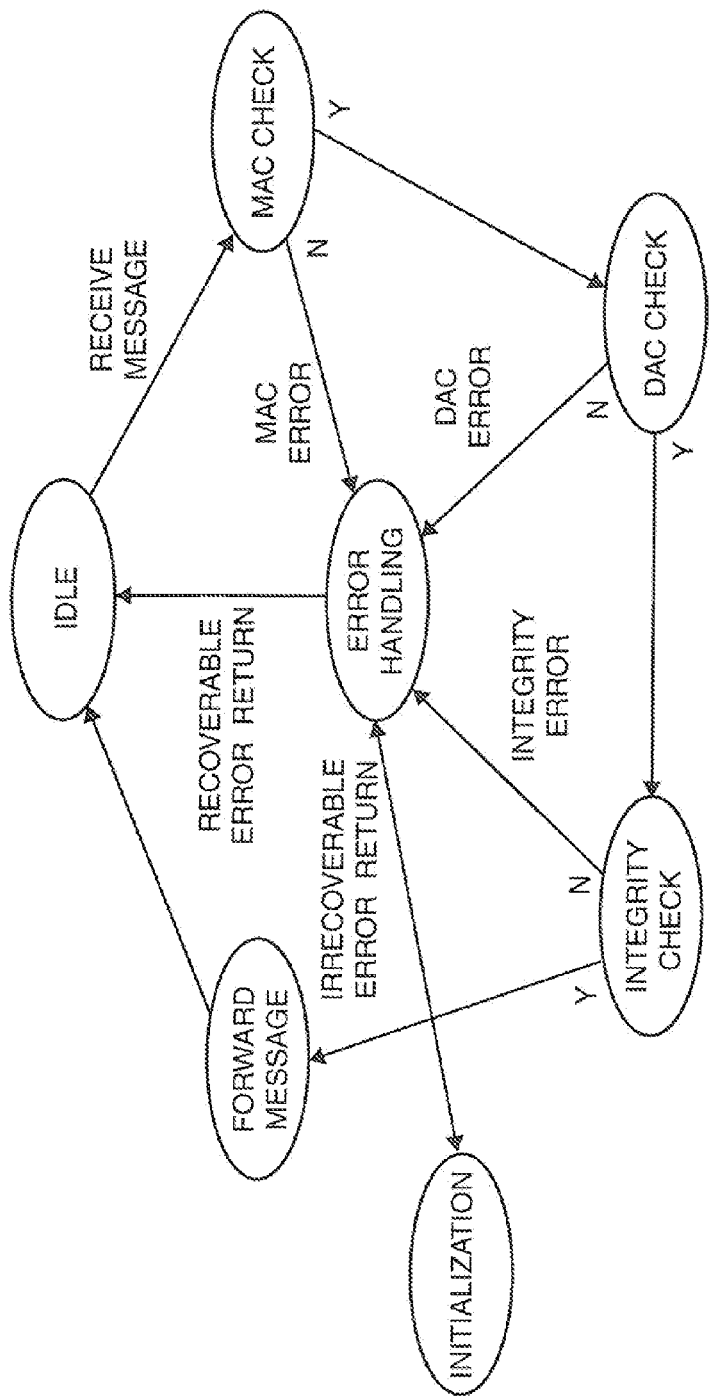
FIG. 5 is a state diagram showing control functions of the transport guard.

Upon receiving valid initialization vectors from the security manager, each transport guard 16 transitions to the control access state shown in FIG. 5. Header labels of message data packets received on the data port 22 from the networking stack 17 are checked against the mandatory access control (MAC), discretionary access control (DAC), and integrity policies of the network 10 according to the configuration data supplied to the guard for the protected application 18. For example, a guard 16 may implement the mentioned Bell-La Padula MAC security model, and be configured to handle messages with single hierarchical classification fields and up to N non-hierarchical classification fields. Discretionary access control by a given guard 16 may be implemented by way of an access control list (see FIG. 9) that identifies the addresses of all other transport guards with which the given guard may communicate, including directional control (receive only, transmit only, or both). Further, the guard 16 may be configured to implement the mentioned BIBA integrity model.

Once a given transport guard 16 determines that incoming message data is acceptable, it forwards the data to the application port 20 for use by the protected application 18. Two configurations of the transport guard 16 may be implemented, namely; one that protects an untrusted application and one that protects a trusted application. A state diagram for a guard configured to protect untrusted applications is shown in FIG. 6, and a state diagram for a guard configured to protect trusted applications is shown in FIG. 7.

Figure 6:
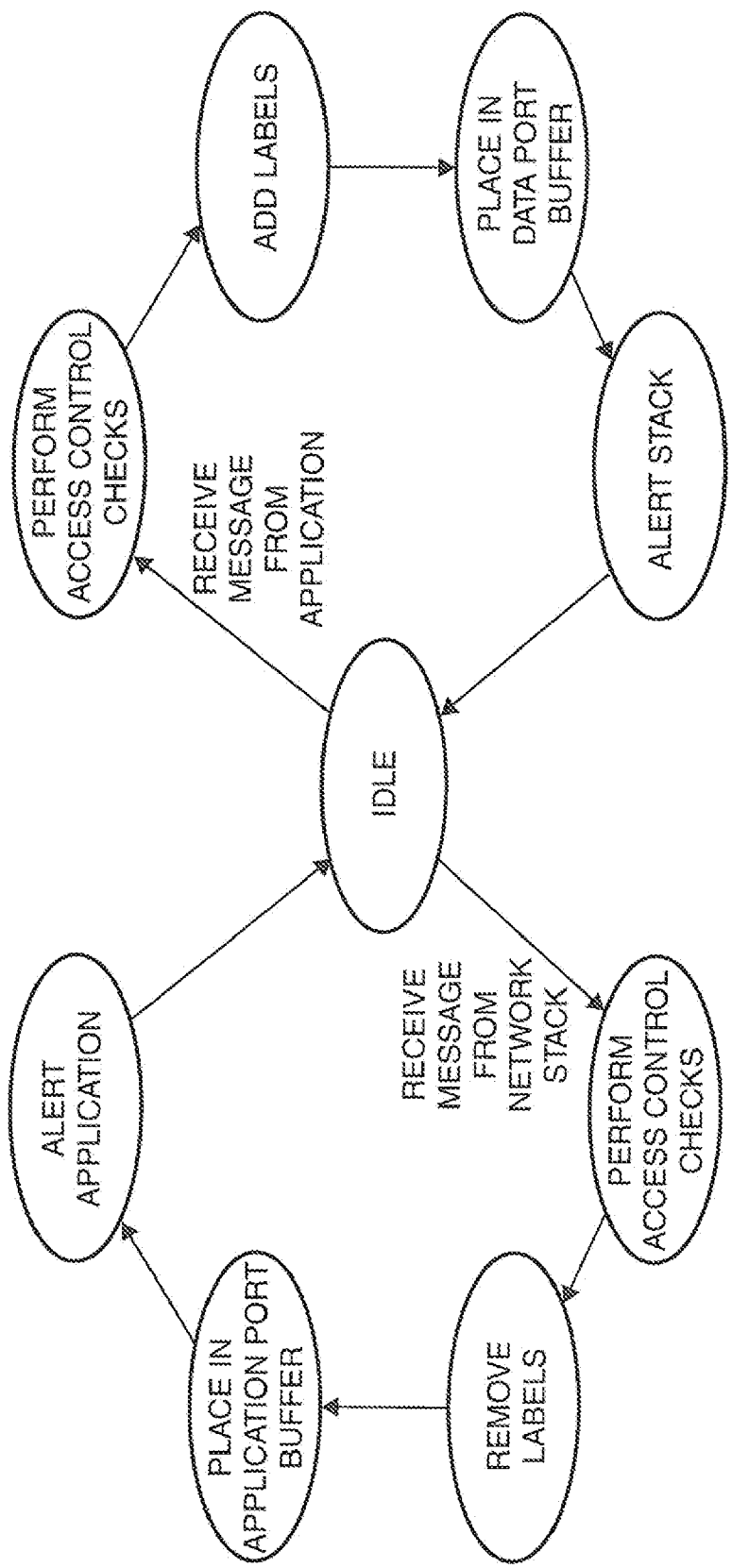
FIG. 6 is a state diagram illustrating operation of the transport guard for untrusted applications.

As shown at the left in FIG. 6, a transport guard that protects an untrusted application is configured so that after performing access control and integrity checks on incoming message data from the networking stack, security labels are stripped or removed from the data prior to placing the data in a buffer for the application port 20, and alerting the application to retrieve the buffered data. Likewise, as seen at the right of the figure, the guard is configured so that after performing access control and integrity checks on outgoing data from the application, the guard adds the appropriate security labels to the data before placing it in a buffer and alerting the networking stack to accept the data for flow into the kernel 14.

For an untrusted application, high and low values of the range for the classification and the integrity levels are preferably set equal in the configuration data for the associated guard 16. Access control lists are provided to the guard to identify those system objects with which the guard may allow communication, with associated information flow control (send and/or receive). The access control lists also identify the associated MAC labels (range) and integrity labels (range) associated with those objects allowed to communicate with the guard's protected application.

Figure 7:
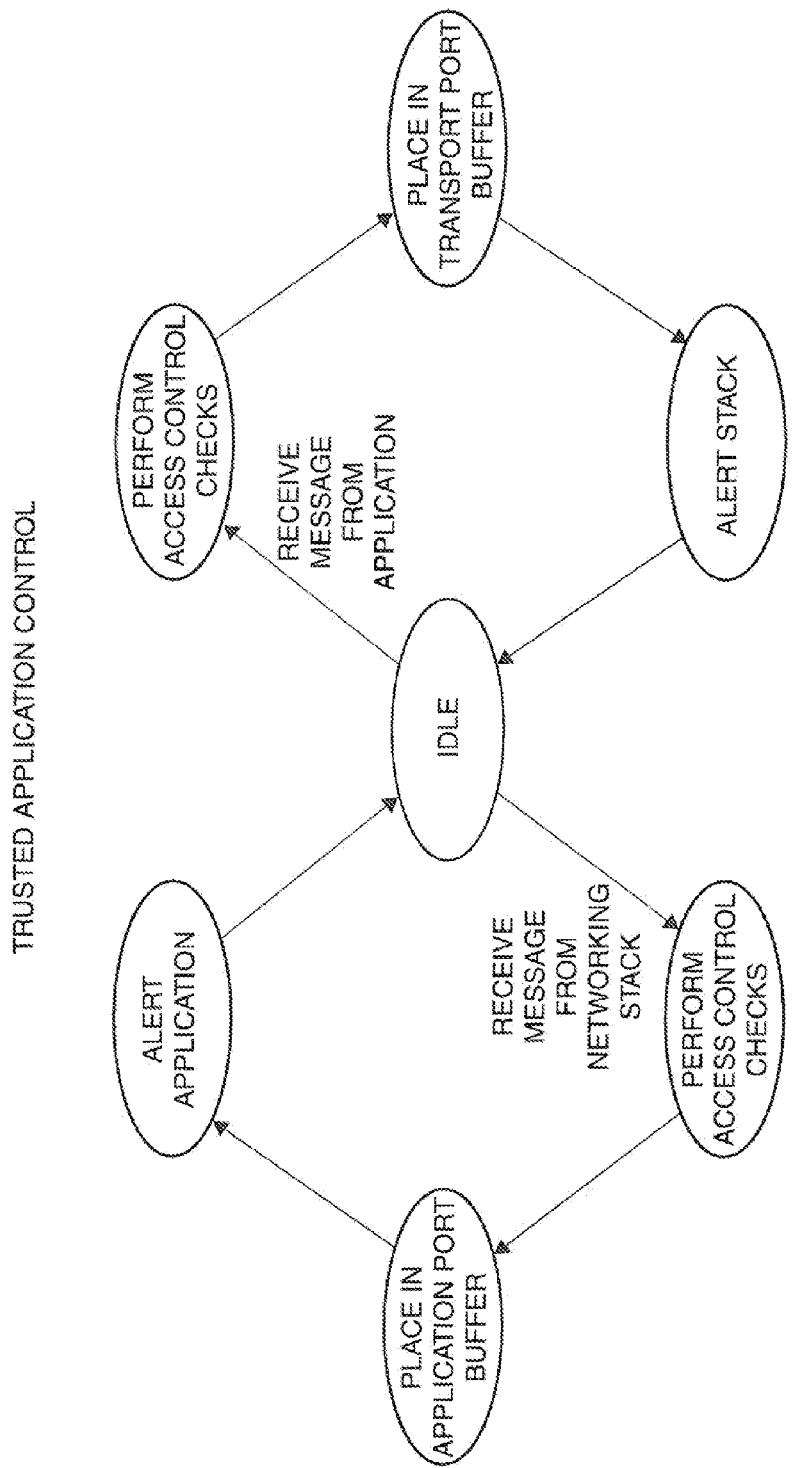
FIG. 7 is a state diagram illustrating operation of the transport guard for trusted applications.

As seen at the left in FIG. 7, a transport guard that protects a trusted application is configured so that after performing access control and integrity checks on incoming message data from the networking stack 17, the data is placed directly in the buffer for the application port 20, leaving intact any MAC and integrity security labels in the incoming data packets. That is, the guard retains the incoming security header labels when making data available at the application port 20. Trusted applications that support multiple security and integrity levels need to retain the access control and the integrity labels on the incoming message data, so that the application can manage information within the data properly.

As shown at the right in FIG. 7, a guard that protects a trusted application is also configured so that after performing the access control and integrity checks on outgoing message data from the application, security labels applied to the data packets by the application are left in tact, and the data is placed directly in a buffer to flow into the networking stack 17. Configuration data for a transport guard that protects a trusted application includes, for example, an access control list, ranges of integrity levels and classification levels that are supported by the application, as well as security labels of applications that are permitted to communicate with the protected application.

In all cases, if an auditable event occurs, the transport guard which detected the event is preferably configured to report the event to the network security manager via the guard's control/status port 24.

FIG. 8 is an example of a security header 90 that may be appended to data packets managed by the transport guards 16. In a preferred embodiment, the transport guards 16 encapsulate high level (e.g., application) data similar to a known mechanism by which IP encapsulates a TCP message, by pre-pending the security header of FIG. 8 to a TCP message having its own header and data. A source field 92 contains a designated address for the specific transport guard from which a given data packet originates, i.e., the guard that sources the packet; and a destination field 94 contains a designated address for the transport guard to which the data packet is destined, i.e., the guard that sinks the packet. Both the source and the destination fields 92, 94 may have a length of, e.g., 32-bits each.

A classification field 96 in the header 90 represents a classification or hierarchical level for the given packet. The classification field 96 may be, e.g., 8-bits long with a 0 (binary 00) representing Unclassified, a 1 (binary 01) representing Confidential, a 2 (binary 10) representing Secret, and a 3 (binary 11) representing Top Secret. All other values may remain unused. The next three fields 98, 100, 102 represent non-hierarchical labels (Compartments) for mandatory access control (MAC) to be associated with the data packet. Up to three labels are supported in the illustrative embodiment.

As mentioned, MAC enforces a network's security policy based upon both hierarchical and non-hierarchical data. For example, a hierarchical portion of the header 90 is the classification field 96 which contains a classification level or security clearance. The non-hierarchical fields 98, 100, and 102 place additional restrictions on an associated data packet, unrelated to the clearance of the user or classification of the data (e.g., US only). A non-governmental example may include the position of a user within a company (e.g., vice-president) for the hierarchical field 96 of the header 90, and a department within the company (e.g., finance) for one of the non-hierarchical fields 98, 100 and 102. Each of the fields 98, 100, 102 may also be, e.g., 8-bits in length.

The last field 104 represents an integrity level for the data packet. The field 104 is, e.g., 8-bits long, with a 0 (binary 00) corresponding to low integrity, a 1 (binary 01) representing medium integrity, and a 2 (binary 10) corresponding to high integrity. All other values may remain unused.

FIG. 9 is an illustrative representation of an access control table 120 for each of a number of system transport guards 16, according to the invention.

Fields in a first row 122 of the table 120 represent certain values for the local transport guard, i.e., the guard 16 in which the table is 120 is configured. The first row 122 has fields that contain (i) the local guard's address, (ii) the lowest classification level supported by the guard, (iii) the highest classification level supported by the guard, (iv) up to three non-hierarchical labels, and (v) an integrity label. Items (ii) and (iii) may therefore implement the mentioned Bell La Padula security model. The table 120 also has "Receive" and "Transmit" fields, in which no entries are provided in the first row 122 for the local guard.

A second row 124 and subsequent rows contain the above information for other transport guards with which the local transport guard is allowed to communicate under the applicable discretionary access control (DAC) network security policy. Row 124 and the following rows each contain an address of the corresponding guard, the lowest classification level supported by the guard, the highest classification level supported, up to three non-hierarchical labels, and an integrity label for the guard. The DAC policy is further implemented by the Receive and the Transmit fields in the rows for the other guards wherein, for example, a "1" in both fields means the local transport guard is allowed to receive data from and to transmit data to the corresponding other guard.

Example One

Figure 10:
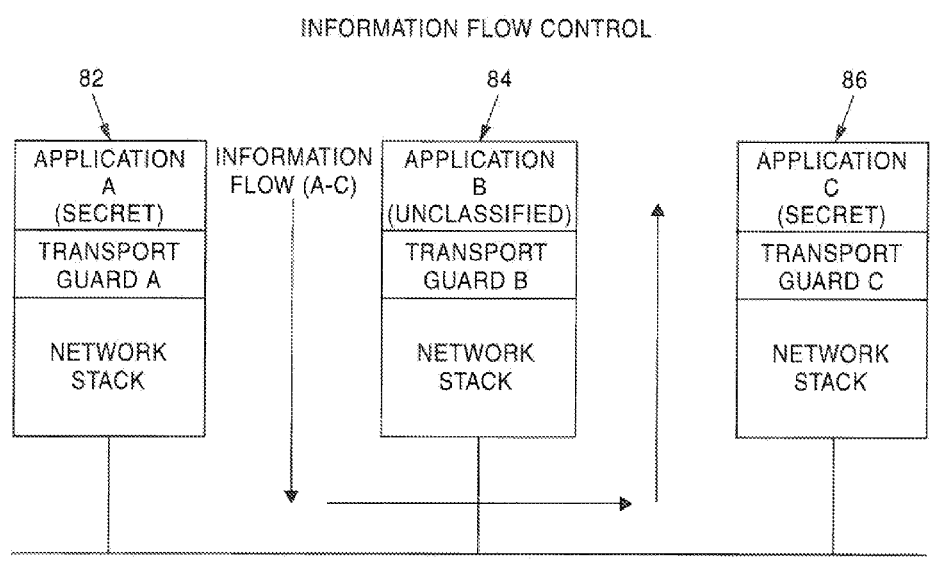
FIG. 10 is a block diagram depicting information flow through a secure network in which a number of the transport guards are embedded.

FIG. 10 illustrates an example of information flow control provided by three transport guards according to the invention, the guards being designated in the figure by the letters A, B and C. The guards reside within corresponding partitions 82, 84 and 86, between a networking stack and an associated application that resides on its own processor within the corresponding partition. The example assumes that:

1. The access control tables 120 for the transport guards A, B, and C are configured (via a DAC entry) to support information flow between application A and application C;
2. Transport guards A and C have their tables 120 configured to support untrusted applications at a Secret classification;
3. Transport guard B has its table 120 configured to support an untrusted application at an Unclassified classification; and
4. The tables 120 for all transport guards are configured to support applications having "low" integrity (integrity label).

When application A attempts to send a data packet to application C, the packet first must flow through guard A. Upon examination of destination information in the packet, local transport guard A will confirm from its access control table 120 that (i) the label (Secret) associated with the transport guard for application C is identical to that for application A, (ii) the destination (transport guard for application C) is listed as an object to which the guard A is permitted to send data packets, and (iii) the integrity label (low) associated with destination, is identical to the integrity label for Application A.

Once all the above checks are successfully completed, transport guard A forwards the data packet to the networking stack in partition 82 for delivery over the network 10 to transport guard C in partition 86. Transport guard C then makes all the necessary security checks to determine if the arriving packet is one that may be received by application C. Upon successfully completing the access checks, transport guard C forwards the data packet to application C.

In the event application A in partition 82 attempts to send a data packet to application B in partition 84, transport guard A first makes the required access control checks. Because a MAC check will fail (i.e., SECRET is greater than UNCLASSIFIED), transport guard A will drop the packet and report an auditable event to the network security manager or service. If the MAC check inadvertently overlooks the inequality of the security classifications, a DAC check by transport guard A will determine that application A is not permitted to send data to application B, and the packet will be dropped.

The inventive transport guards offer security policy enforcement within the networking stacks of local partitions and also provide inter-partition security services, without having to rely on encryption. The guards enforce mandatory access control, discretionary access control, integrity, and information flow. Moreover, the guards 16 may be implemented between any two layers of the networking stack above the media access control (e.g., Ethernet) layer of the OSI network reference model, for example and without limitation, between CORBA and TCP, or between Ethernet and IP. Networks having commercial off the shelf (COTS) transport technologies such as CORBA, TCP, and IP may therefore retain such features even after the inventive guards 16 are embedded in the networks.

Example Two

Figure 11:
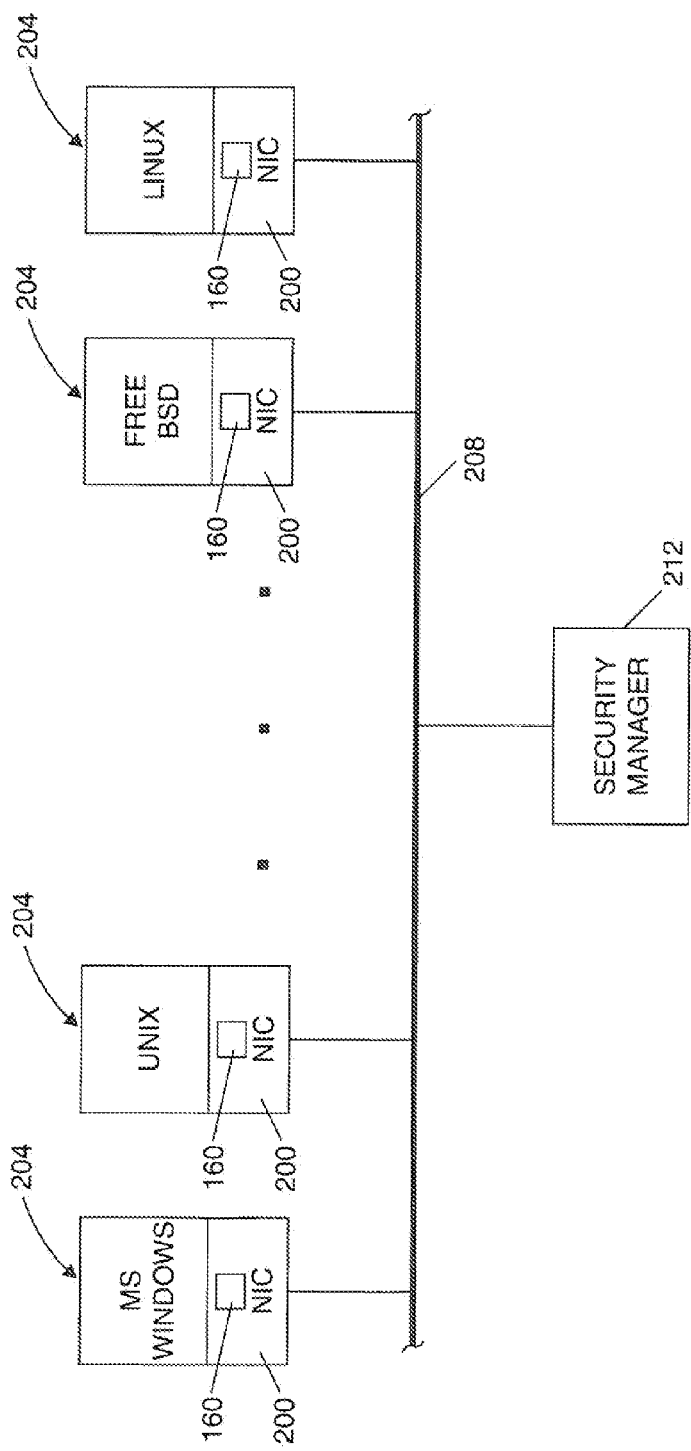
FIG. 11 is a block diagram of a network having a number of workstations, each of which is protected by a network interface device according to the invention.

FIG. 11 shows an example of the use of a transport guard 160 at the medium access control (MAC) or Ethernet layer, wherein the guard 160 may be constructed and configured similar or identical to the inventive transport guard 16 of FIG. 2. The guard 160 is incorporated in each of a number of network interface devices or cards (NICs) 200, wherein each guard 160 includes a control component 222 and a guard component 223 (see FIG. 12). Each NIC 200 implements the transport guard 160 as a reference monitor at the MAC layer of the OSI network model, so that the monitor is always invoked, tamper proof, non-bypassable, and evaluatable.

In FIG. 11, the network interface cards 200 provide access control for a number of workstations 204 that are preferably system high and operate on a benign multi-level network 208. The cards 200 may be used with workstations 204 running, for example, Microsoft Windows®, LINUX®, or any UNIX®-like operating system such as FreeBSD on, for example, an Ethernet backbone network. The transport guard 160 embedded in each NIC 200 restricts outgoing traffic only to certain destinations for which the card 200 has been authorized, and provides security labels for such outgoing traffic. Each card 200 thus ensures that all information flowing to or from its protected workstation at the physical Ethernet or PHY layer of the network 208 complies with mandatory, discretionary, and integrity access control policies of the overall network. A security manager workstation 212 on the network 208 supplies security configuration commands for each workstation 204 to the workstation's card 200, as explained below.

Figure 12:
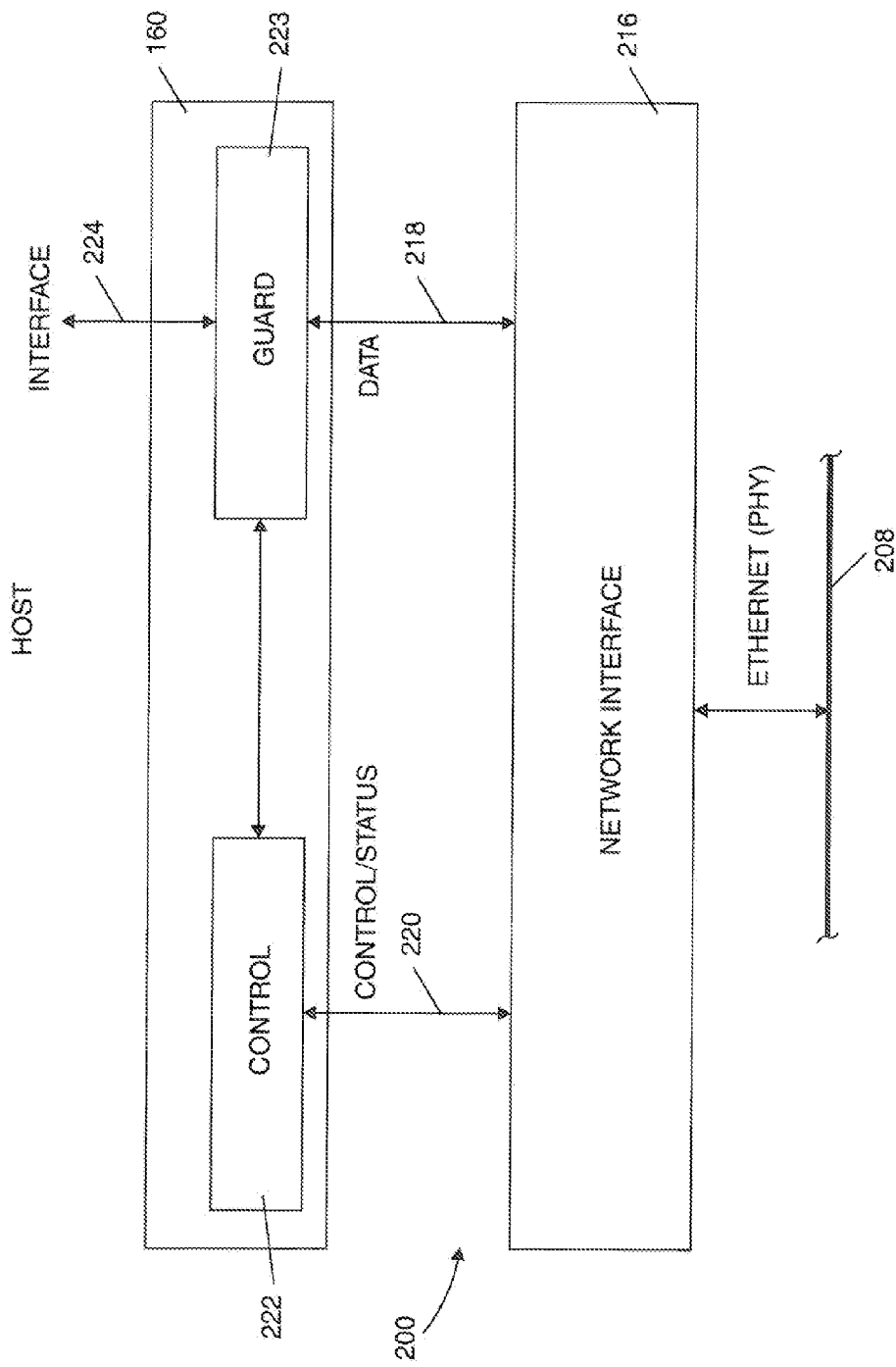
FIG. 12 is a block diagram of the inventive interface device.

FIG. 12 illustrates an architecture for each card to 200 wherein certain interfaces are configured to communicate with external objects. A network (e.g., Ethernet) interface 216 is configured in a known manner to interface with the network PHY layer through the use of two medium access control (MAC) addresses. A first MAC address is associated with a guard control and status interface 220 which delivers security configuration commands from the security manager workstation 212 (FIG. 11) to the guard control component 222. A second MAC address is associated with a data Ethernet interface 218 that supports traffic to and from the protected host. The control component 222 configures corresponding security properties (e.g., mandatory access control, discretionary access control and integrity labels) in the guard component 223 of the transport guard 160. Once the labels and policies are configured, the guard 160 may accept user traffic. Auditable events are reported through the control/status interface 220.

The transport guard 160 receives outgoing message requests from its protected host through a host interface 224, and sends outgoing messages from the host interface 224 through the data interface 218 only after the guard component 223 verifies that the corresponding requests meet all network access control policies. Transport guard 160 receives incoming message data through the data interface 218 of the card 200, and sends incoming data to the protected workstation through the host interface 224 only after verifying that the data meets the access control policies.

Figure 13:
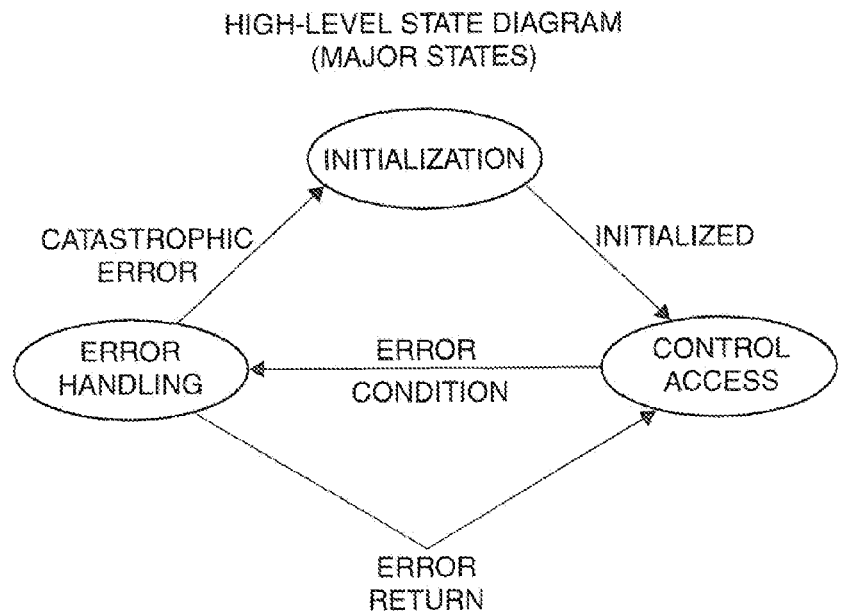
FIG. 13 is a high level state diagram for the interface device.

FIG. 13 is a high level state diagram for the inventive network interface device or NIC 200. Each NIC 200 may operate in one of the three active states shown in FIG. 13, namely; initialization (see FIG. 14), control access (see FIGS. 15 & 16), and error handling (see FIG. 17).

Figure 14:
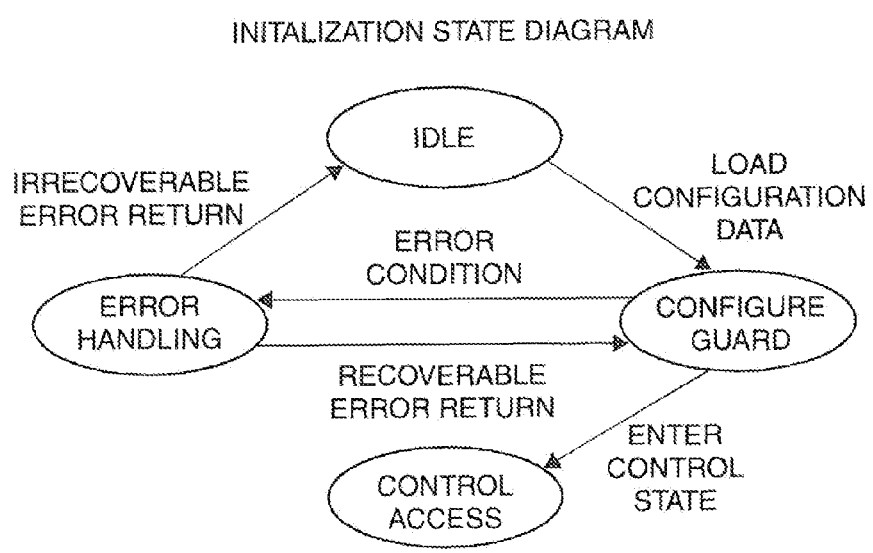
FIG. 14 shows an initialization state for the interface device.

FIG. 14 shows the initialization state. Each NIC 200 starts with its host interface 224 and data interface 218 both inhibited. The network security manager 212 (FIG. 11) initializes the card 200 by addressing configuration data to the card's control/status interface 222 at the above mentioned first address. The data may include, e.g., integrity levels, classification levels, and access control lists. Links between the security manager 212 and the various cards' control and status interface 222 rely preferably on digital signatures and/or other security measures to invoke a trusted path function for each of the various links.

Figure 15:
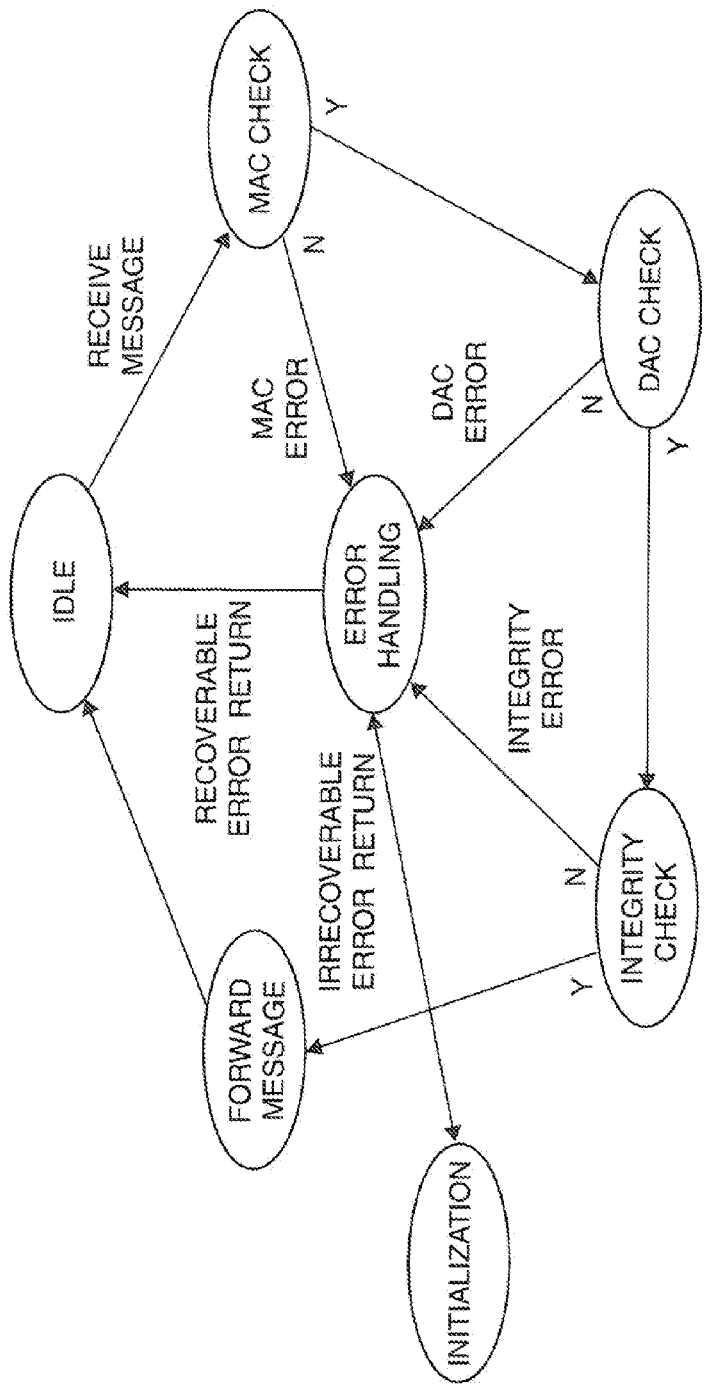
FIGS. 15 and 16 illustrate operation of the interface device when protecting a system high host.

Upon receiving valid initialization vectors from the security manager 212, the NIC 200 transitions to the control state. Each card 200 may support messages with a single hierarchical classification field, and up to N non-hierarchical fields. FIG. 15 is a control access state diagram wherein for each message received either from the protected host or from another host on the network 208, the transport guard 160 in each NIC 200 implements a known mandatory access control security model (e.g., requiring the MAC labels to be identical), as well as a discretionary access control model using lists identifying other hosts with which its protected host is permitted to communicate, as well as directional control (send and/or receive). Integrity levels may include a range of integrity levels supported by the protected host. Each NIC 200 may support a host at a single label identifying both a classification level, and all compartments supported by the host.

Figure 16:
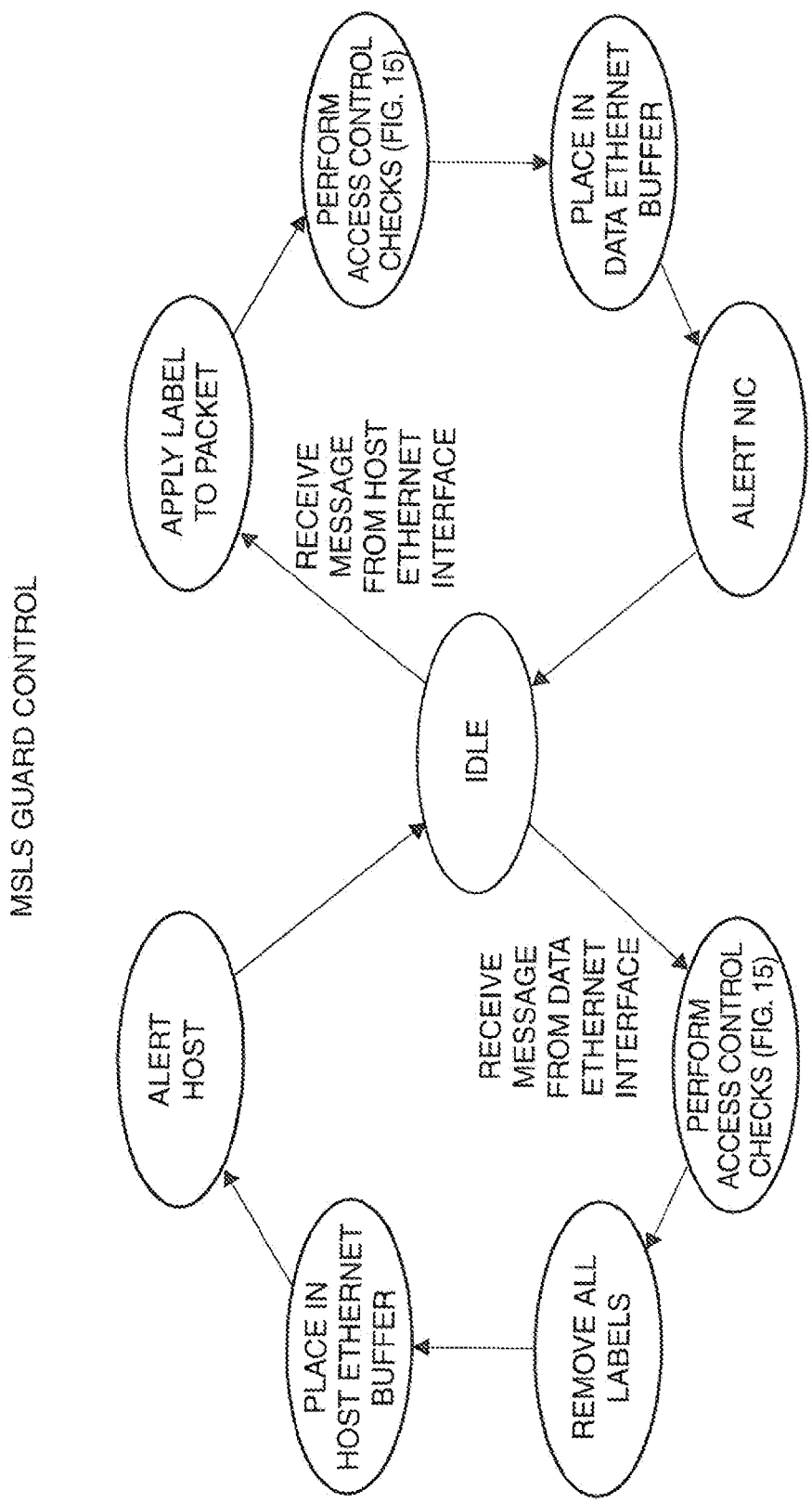
Figure 17:
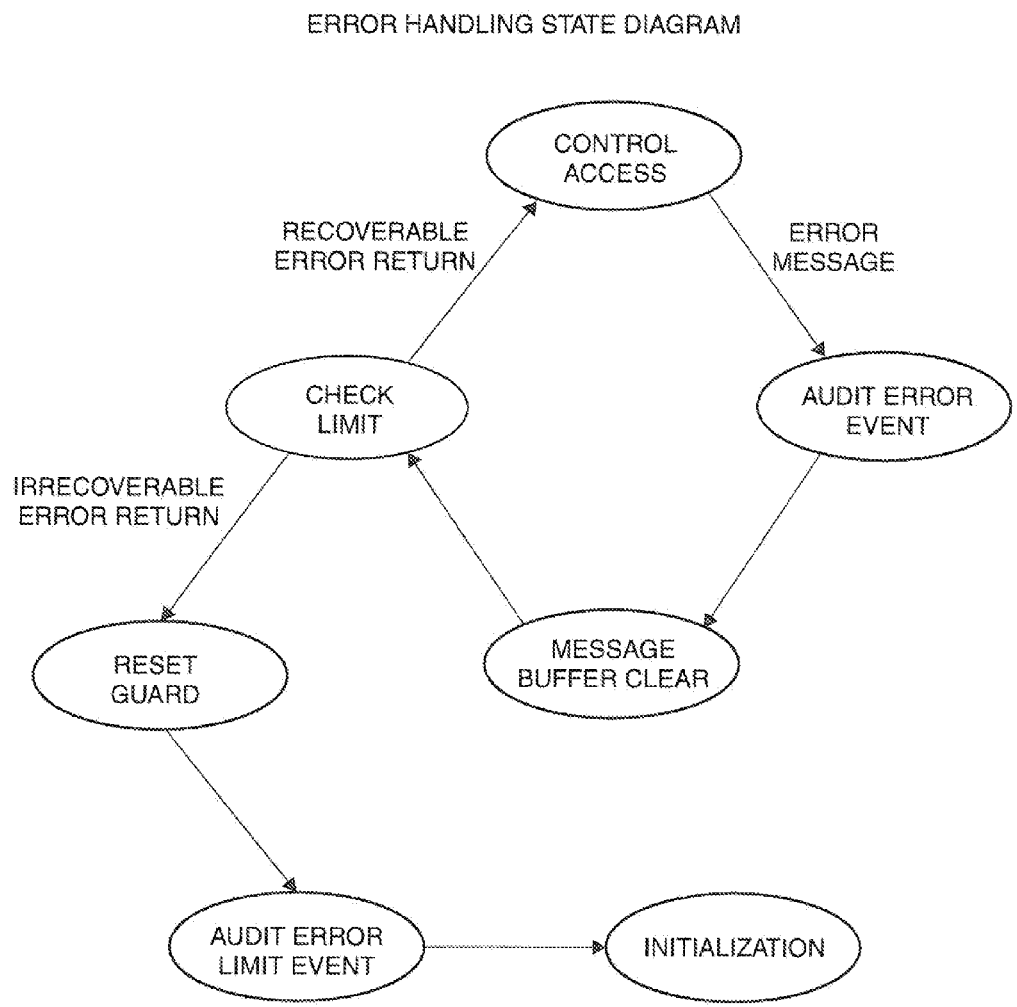
FIG. 17 is an error handling state diagram for the interface device.

FIG. 16 illustrates the operation of the transport guard 160 in each NIC 200 protecting a system high host. As shown at the left in FIG. 16, upon receipt of inbound data on the data interface 218, each NIC 200 evaluates the data's label against the MAC, DAC, and integrity policies configured in the guard component 223 of the transport guard 160 for the protected host. If acceptable, the data is passed to a buffer for the host interface 224 for consumption by the protected host, and the host is alerted after the labels are stripped from the data.

As seen at the right in FIG. 16, upon receipt of outbound data from the host on the host interface 224, the guard component 223 applies the host's label to the data, and checks the label against the label of the destination host for integrity, MAC, DAC, and information flow control. In addition, the guard component 223 checks the data label against the label received from the security manager. Once all security checks are passed, the outbound data with the label is passed to a buffer for the data interface 218. In all cases, if an auditable event occurs, the control component 222 of the transport guard 160 reports the event to the security manager 212 via the control/status interface 220.

In the disclosed embodiment, each NIC 200 provides access control support for an untrusted host workstation which is presumed to be system high. It will be understood by those skilled in the art, however, that various modifications and changes may be made without departing from the spirit and scope of the invention. Accordingly, the invention includes all such modifications and changes that are within the bounds of the following claims.

We claim:

1. A network interface device for providing a desired level of security for a protected host or workstation on a multi-level secure network, the device comprising:
a network interface configured to connect operatively with a multi-level secure network over which data is exchanged among a number of hosts, and the network interface has a first Ethernet or medium access control (MAC) address corresponding to a guard control port of the interface, and a second Ethernet or MAC address corresponding to a guard data port of the interface; and
a transport guard having (i) a control component coupled to the guard control port of the network interface for processing configuration data addressed to the first MAC address and for producing a corresponding security configuration output, (ii) a guard component coupled to the output of the control component and to the guard data port of the network interface, and (iii) a host interface coupled to the guard component and configured for exchanging data with the protected host;
wherein the guard component of the transport guard is operative to pass inbound data addressed to the second MAC address from the guard data port of the network interface to the host interface of the transport guard, and to pass outbound data at the host interface to the guard data port of the network interface, according to the security configuration output from the control component of the transport guard.

2. A network interface device according to claim 1, wherein the control component of the transport guard is configured to report an auditable event through the guard control port when the guard component determines that the inbound data fails to meet the security configuration produced by the control component.

3. A network interface device according to claim 1, wherein the control component of the transport guard is configured to report an auditable event through the guard control port when the guard component determines that the outbound data fails to meet the security configuration produced by the control component.

4. A network interface device according to claim 1, wherein the guard component of the transport guard is configured to remove security labels from the inbound data before passing the data to the host interface.

5. A network interface device according to claim 1, wherein the guard component of the transport guard is configured to add security labels to the outbound data before passing the data to the guard data port.

6. A network interface device according to claim 1, wherein the configuration data includes an integrity level.

7. A network interface device according to claim 1, wherein the configuration data includes a security classification level.

8. A network interface device according to claim 1, wherein the configuration data includes an access control table for identifying other hosts on the network with which the protected host may communicate according to a discretionary access control (DAC) policy of the network.

9. A network interface device according to claim 8, wherein the access control table indicates whether or not the protected host may address outbound data to a given one of the other hosts on the network.

10. A network interface device according to claim 8, wherein the access control table indicates whether or not the protected host may receive inbound data from a given one of the other hosts on the network.

11. A multi-level secure network, comprising:

a number of workstations configured to exchange data with one another in accordance with a defined network security policy;

a network interface device associated with each workstation, wherein each network interface device protects its associated workstation and has:

(a) a network interface configured to connect operatively with the network, wherein the interface has a first Ethernet or medium access control (MAC) address corresponding to a guard control port of the device, and a second Ethernet or MAC address corresponding to a guard data port of the device; and (b) a transport guard having (i) a control component coupled to the guard control port of the network interface for processing configuration data addressed to the first MAC address and for outputting a corresponding security configuration, (ii) a guard component coupled to the output of the control component and to the guard data port of the network interface, and (iii) a host interface coupled to the guard component and configured for exchanging data with the protected workstation;

wherein the guard component of the transport guard is operative to pass inbound data addressed to the second MAC address from the guard data port of the network interface to the host interface of the transport guard, and to pass outbound data at the host interface to the guard data port of the network interface, according to the security configuration output from the control component of the transport guard.

12. A multi-level secure network according to claim 11, including a security manager workstation on the network for sending security configuration data to the network interface devices associated with other workstations on the network.

13. A multi-level secure network according to claim 11, wherein the network interface devices are in the form of network interface cards (NICs).

14. A multi-level secure network according to claim 11, wherein the control component of the transport guard is configured to report an auditable event through the guard control port when the guard component determines that the inbound data fails to meet the security configuration output by the control component.

15. A multi-level secure network according to claim 11, wherein the control component of the transport guard is configured to report an auditable event through the guard control port when the guard component determines that the outbound data fails to meet the security configuration output by the control component.

16. A multi-level secure network according to claim 11, wherein the configuration data includes an integrity level.

17. A multi-level secure network according to claim 11, wherein the configuration data includes a security classification level.

18. A multi-level secure network according to claim 11, wherein the configuration data includes an access control table for identifying other workstations on the network with which the protected workstation may communicate according to a discretionary access control (DAC) policy of the network.

19. A multi-level secure network according to claim 18, wherein the access control table indicates whether or not the protected workstation may address outbound data to a given one of the other workstations on the network.

20. A multi-level secure network according to claim 18, wherein the access control table indicates whether or not the protected workstation may receive inbound data from a given one of the other workstations on the network.

* * * * *